United States Patent
Lee et al.

(10) Patent No.: US 9,215,360 B2
(45) Date of Patent: Dec. 15, 2015

(54) CAMERA MODULE HAVING SHIELD CAN

(71) Applicant: SAMSUNG ELECTRO-MECHANICS CO., LTD., Suwon (KR)

(72) Inventors: Sang Jin Lee, Suwon (KR); Kyu Beom Cho, Suwon (KR); Woong Tae Jung, Suwon (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 140 days.

(21) Appl. No.: 13/888,755

(22) Filed: May 7, 2013

(65) Prior Publication Data

US 2014/0168509 A1    Jun. 19, 2014

(30) Foreign Application Priority Data

Dec. 18, 2012  (KR) .................. 10-2012-0148511

(51) Int. Cl.
  *H04N 5/225*   (2006.01)
  *F21V 7/00*    (2006.01)

(52) U.S. Cl.
  CPC .................. *H04N 5/2256* (2013.01)

(58) Field of Classification Search
  USPC ...................... 348/374, 340; 438/65
  See application file for complete search history.

(56) References Cited

U.S. PATENT DOCUMENTS

2008/0254652 A1*  10/2008  Ma .................. 439/67
2011/0188253 A1*  8/2011   Kim et al. ........ 362/296.01

FOREIGN PATENT DOCUMENTS

JP    2006-221098     8/2006
KR    10-2011-0043350  4/2011
KR    10-2012-0021085  3/2012

\* cited by examiner

*Primary Examiner* — Joel Fosselman
(74) *Attorney, Agent, or Firm* — NSIP Law

(57) ABSTRACT

There is provided a camera module including a housing having a lens part installed therein; a flexible circuit board having an extension part on which a lamp is installed, the extension part being coupled to the housing such that the lamp is disposed to be adjacent to the lens part; and a shield can having first and second through-holes formed therein such that the lens part and the lamp are exposed therethrough.

20 Claims, 6 Drawing Sheets

CAMERA MODULE HAVING SHIELD CAN

CROSS-REFERENCE TO RELATED APPLICATIONS

This application claims the priority of Korean Patent Application No. 10-2012-0148511 filed on Dec. 18, 2012, in the Korean Intellectual Property Office, the disclosure of which is incorporated herein by reference.

BACKGROUND OF THE INVENTION

1. Field of the Invention

The present invention relates to a camera module.

2. Description of the Related Art

Recently, camera modules have increasingly been provided in mobile communications terminals such as cellular phones, personal digital assistants (PADS), and the like.

In addition, camera modules are generally mounted on printed circuit boards on which various electronic devices are mounted together therewith to perform respective roles. Here, the various electronic devices are generally configured to form an integrated module on the printed circuit board.

However, the integrated module used in the mobile communications terminal may be exposed to excessive propagation interference, which may cause errors in the functioning of the electronic devices forming the integrated module.

In order to solve the above-mentioned defect, a shield can formed of a metal is generally used. This shield can forms an outer casing of the camera module and serves to shield the electronic devices from the effects of propagation interference exerted therebetween and protect the camera module from external impacts.

In addition, the camera module may be provided with a lamp for night photography. Meanwhile, a camera module according to the related art has a structure in which a lens part and a lamp are individually fixed and the shield can is generally only connected to the lens part.

However, since an error in a function of the lamp may be caused by propagation interference, both of the lamp and the lens part should be protected by the shield can. Therefore, the development of a shield can structure capable of covering the lamp and the lens part has been urgently demanded.

RELATED ART DOCUMENT (Patent Document 1) Korea Patent Laid-Open Publication No. 2010-0085134

SUMMARY OF THE INVENTION

An aspect of the present invention provides a camera module capable of exposing a lens part and a lamp to the outside without interference with a shield can.

An aspect of the present invention also provides a camera module capable of accurately disposing a lens part and a lamp below first and second through-holes formed in a shield can.

According to an aspect of the present invention, there is provided a camera module including: a housing having a lens part installed therein; a flexible circuit board having an extension part on which a lamp is installed, the extension part being coupled to the housing such that the lamp is disposed to be adjacent to the lens part; and a shield can having first and second through-holes formed therein such that the lens part and the lamp are exposed therethrough.

The shield can may include a first plate having the first through-hole formed therein to expose the lens part and a second plate extended from the first plate and having the second through-hole formed therein.

The shield can may further include a first position determining part extended from one side of the second plate and bent to press the extension part.

The shield can may further include a second position determining part extended from the other side of the second plate so as to face the first position determining part and bent twice so as to contact one side surface of the housing while simultaneously pressing the extension part.

The shield can may further include a first sidewall extended from one end of the first plate downwardly in a height direction.

The first sidewall may be provided with a first insertion hole into which a first coupling protrusion formed on the housing is inserted.

The shield can may further include a second sidewall extended from one end of the second plate downwardly in a height direction so as to face the first sidewall.

The second sidewall may be provided with a second insertion hole into which a second coupling protrusion formed on the housing is inserted.

The first plate may be provided with extension wall bodies contacting a front surface and a rear surface of the housing and facing each other.

The shield can may further include a first position determining part extended from one side of the second plate and bent to press the extension part, and a second position determining part extended from the other side of the second plate so as to face the first position determining part and bent twice so as to contact one side surface of the housing while simultaneously pressing the extension part, the first and second position determining parts may respectively include a first wall body provided in a height direction and a second wall body extended from the first wall body to press the extension part, and the second position determining part may further include a third wall body extended from the second wall body downwardly in a height direction.

The first wall body may be extended to be perpendicular to the second plate.

The first wall body may be extended from the second plate such that an angle formed between the first wall body and the second plate is an acute angle or an obtuse angle, and the second wall body may include an inclined part bent from the first wall body to thereby be inclined and a pressing part extended from the inclined part and pressing the extension part.

The first through-hole may have a diameter larger than that of the lens part.

The shield can may include: a plate having the first through-hole formed therein to expose the lens part and the second through-hole formed therein to expose the lamp; a first sidewall extended from one end of the plate downwardly in a height direction; and a second sidewall extended from the other end of the plate downwardly in the height direction.

The first sidewall may be provided with a first insertion hole into which a first coupling protrusion formed on the housing is inserted.

The second sidewall may be provided with a second insertion hole into which a second coupling protrusion formed on the housing is inserted.

According to another aspect of the present invention, there is provided a camera module including: a housing having a lens part installed therein; a flexible circuit board having an extension part on which a lamp is installed, the extension part being coupled to the housing such that the lamp is disposed to be adjacent to the lens part; and a shield can having first and second through-holes formed therein such that the lens part and the lamp are exposed therethrough, wherein the shield can includes: a first plate having the first through-hole formed therein to expose the lens part; a second plate having a width smaller than that of the first plate, extended from the first plate, and having the second through-hole formed therein; a first position determining part extended from one side of the second plate and bent to press the extension part; a second position determining part extended from the other side of the second plate so as to face the first position determining part and bent twice so as to contact one side surface of the housing while simultaneously pressing the extension part; a first sidewall extended from one end of the first plate downwardly in a height direction; and a second sidewall extended from one end of the second plate downwardly in the height direction so as to face the first sidewall.

The first sidewall may be provided with a first insertion hole into which a first coupling protrusion formed on the housing is inserted, and the second sidewall may be provided with a second insertion hole into which a second coupling protrusion formed on the housing is inserted.

The first and second position determining parts may respectively include a first wall body provided in the height direction and a second wall body extended from the first wall body to press the extension part, and the second position determining part may further include a third wall body extended from the second wall body downwardly in the height direction.

The first wall body may be extended to be perpendicular to the second plate.

The first wall body may be extended from the second plate such that an angle formed between the first wall body and the second plate is an acute angle or an obtuse angle, and the second wall body may include an inclined part bent from the first wall body to thereby be inclined and a pressing part extended from the inclined part and pressing the extension part.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
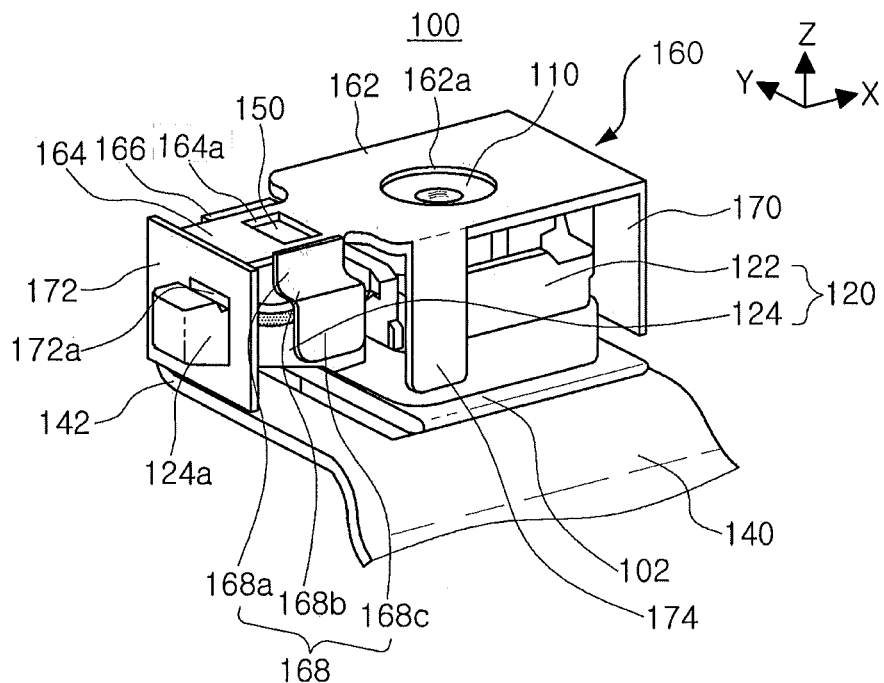
FIG. 1 is a schematic perspective view showing a camera module according to an embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

Figure 2:
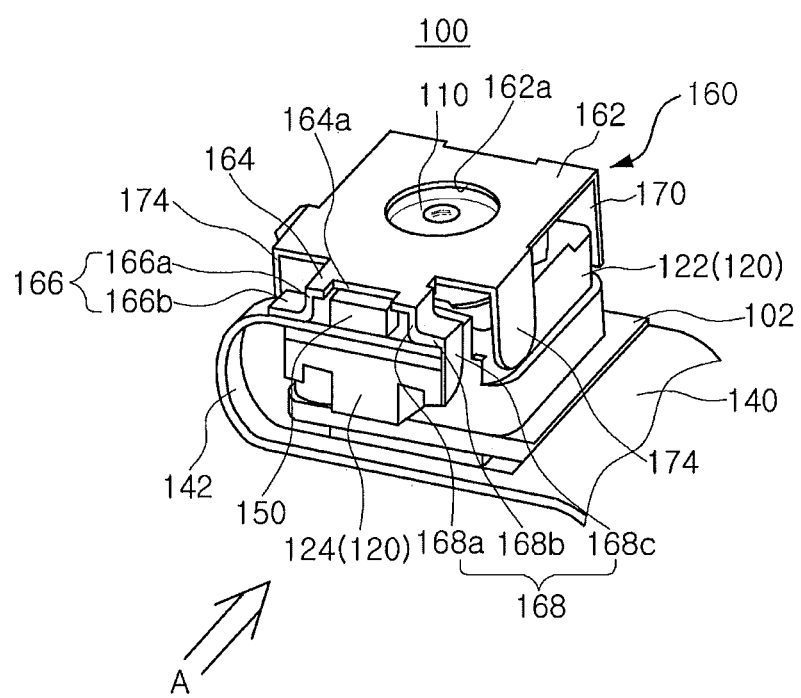
FIG. 2 is a partially cut-away perspective view showing the camera module according to the embodiment of the present invention.

FIG. 1 is a schematic perspective view showing a camera module according to an embodiment of the present invention. FIG. 2 is a partially cut-away perspective view showing the camera module according to the embodiment of the present invention.

Figure 3:
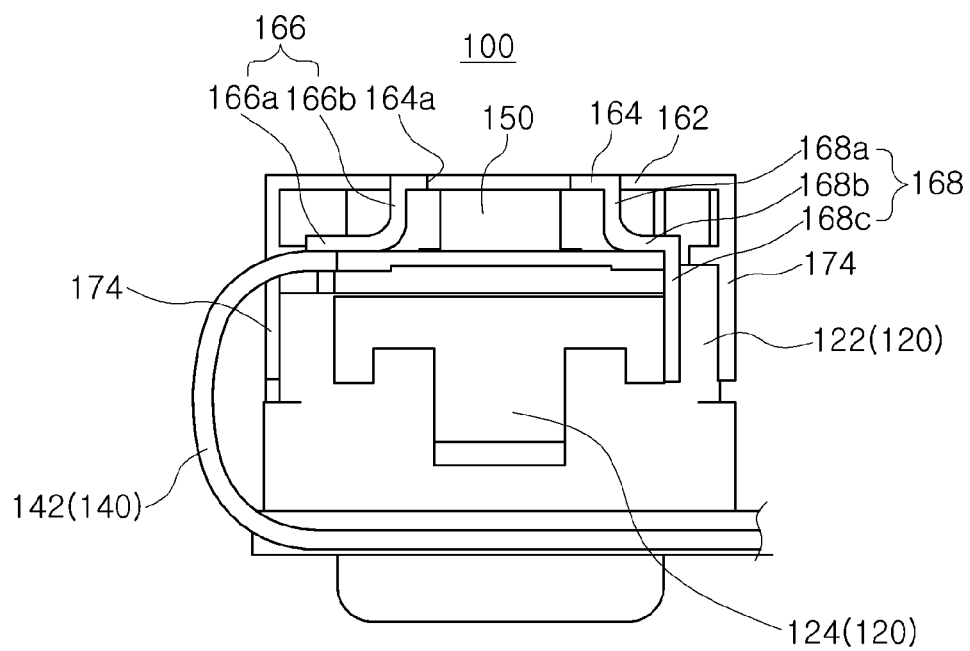
FIG. 3 is a side view of the camera module when viewed from side A of FIG. 2.
Figure 4:
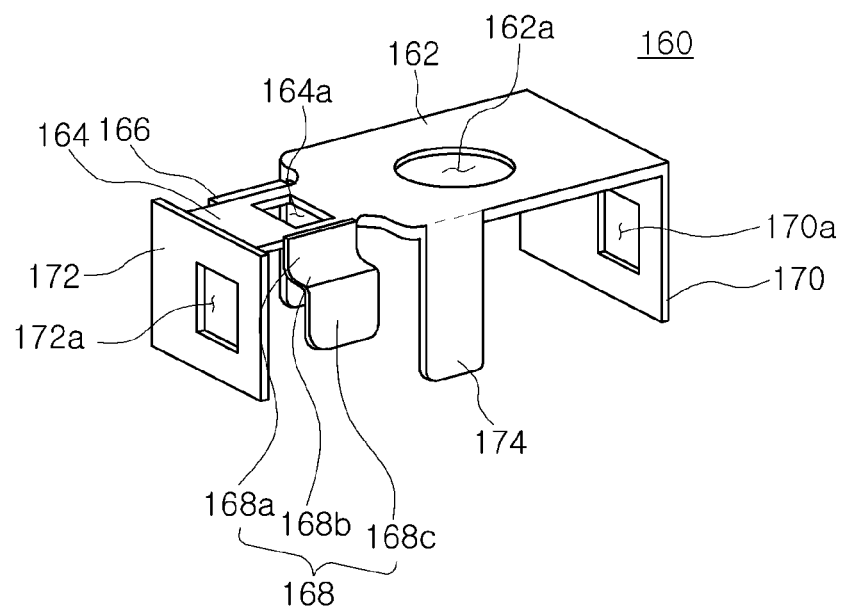
FIG. 4 is a schematic perspective view showing a shield can included in the camera module according to the embodiment of the present invention.

FIG. 3 is aside view of the camera module when viewed from side A of FIG. 2. FIG. 4 is a schematic perspective view showing a shield can included in the camera module according to the embodiment of the present invention.

Referring to FIGS. 1 through 4, a camera module 100 according to an embodiment of the present invention may include a housing 120, a flexible circuit board 140, and a shield can 160 by way of example.

Here, terms with respect to directions will be defined. As viewed in FIG. 1, a length direction refers to an X-axis direction, a width direction refers to a Y-axis direction, and a height direction refers to a Z-axis direction.

The housing 120 may have a lens part 110 installed therein. That is, the lens part 110 may be fixedly installed in an internal space of the housing 120. Here, the lens part 110 will be described. First, the lens part 110 may include a lens unit (not shown) configured of at least one lens, an infrared (IR) filter (not shown), and an image sensor (not shown).

In addition, an upper end portion of the lens unit may be exposed to the outside of the housing 120. That is, the housing 120 may be provided with an opening part such that the upper end portion of the lens unit may be exposed.

In addition, the housing 120 may include a body 122 having the lens part 110 installed therein and a lamp arrangement part 124 extended from the body 122 in the length direction.

Here, terms with four side surfaces of the housing 120 will be described. As viewed in FIG. 1, a surface disposed at the front is defined as a front surface, surfaces disposed at both sides are defined as side surfaces, and a surface at the rear is defined as a rear surface.

Meanwhile, the housing 120 may be provided with a first coupling protrusion (not shown) for determining a position of the shield can 160. That is, one side surface of the housing 120, in other words, the body 122 of the housing 120 may be provided with the first coupling protrusion (not shown). The first coupling protrusion (not shown) may serve to determine the position of the shield can 160 in the length direction.

In addition, the housing 120 may be provided with a second coupling protrusion 124a for determining the position of the shield can 160. That is, the other side surface of the housing 120 may be provided with the second coupling protrusion 124a. In other words, the lamp arrangement part 124 may be provided with the second coupling protrusion 124a disposed on a surface opposite to a surface on which the first coupling protrusion (not shown) is disposed.

The second coupling protrusion 124a may serve to determine, together with the first coupling protrusion (not shown), the position of the shield can 160 in the length direction.

Meanwhile, the housing 120 may be fixedly installed on a substrate 102 on which an image sensor is fixedly installed.

The flexible circuit board 140 may have an extension part 142 on which a lamp 150 is installed, and the extension part 142 may be coupled to the housing 120 such that the lamp 150 is disposed to be adjacent to the lens part 110.

That is, the extension part 142 may have the lamp 150 installed on a lower surface thereof and be bent to thereby be bonded to an upper surface of the lamp arrangement part 124 of the housing 120. To this end, an adhesive may be applied to the lamp arrangement part 124.

More specifically, the extension part 142 may be bent such that an upper surface thereof may be bonded to the upper surface of the lamp arrangement part 124. Therefore, the lamp 150 installed on the lower surface of the extension part 142 may be disposed in an upward direction.

The lamp 150 may be formed of a light emitting device such as a light emitting diode, or the like, and provide light in an amount required for photographing through the lens part 110. In addition, an amount of light of the lamp 150 may be changed according to a type of the camera module 100 or a type of the lens part 110.

Further, the lamp 150 may be electrically connected to a main circuit device of the camera module 100. The lamp 150 connected as described above may provide light in an amount required at the time of photographing an object according to an operation signal of the camera module 100.

The shield can 160 may have first and second through-holes 162a and 164a formed therein such that the lens part 110 and the lamp 150 may be exposed therethrough. Meanwhile, the shield can 160 may serve to shield an electromagnetic wave and be formed of a metal material.

Meanwhile, the shield can 160 may include a first plate 162, a second plate 164, a first position determining part 166, a second position determining part 168, a first sidewall 170, a second sidewall 172, and extension wall bodies 174.

The first plate 162 may have the first through-hole 162a formed therein in order to expose the lens part 110. In addition, the first plate 162 may be disposed over the body 122 of the housing 120 and have a rectangular shape. Further, the first through-hole 162a may be formed to have a circular shape so as to correspond to a shape of the lens part 110.

However, the first through-hole 162a is not limited to having the circular shape, but may have a rectangular shape, or the like.

In addition, the first through-hole 162a may have a diameter larger than that of the exposed lens part 110.

The second plate 164 may be smaller than the first plate 162 in the width direction, be extended from the first plate 162, and have the second through-hole 164a formed therein.

That is, the second plate 164 may be extended from the first plate 162 so as to be disposed over the lamp arrangement part 124 of the housing 120. Further, the second through-hole 164a may have a rectangular shape so as to correspond to a shape of the lamp 150. However, the second through-hole 164a is not limited to having the rectangular shape, but may also have a circular shape.

Meanwhile, as described above, the first through-hole 162a may have a diameter larger than that of the lens part 110.

Therefore, since the diameter of the first through-hole 162a is larger than that of the lens part 110, a difference in distances between the first and second through-holes 162a and 164a due to processing tolerances of the first and second through-holes 162a and 164a may be compensated.

That is, the center of the first through-hole 162a coincides with the center of the lens part 110, whereby the second through-hole 164a may be disposed directly above the lamp 150. Therefore, shielding of a portion of the lamp 150 by the second plate 164 may be prevented.

The first position determining part 166 may be extended from one side of the second plate 164 and be bent to press the extension part 142. That is, the first position determining part 166 may be extended from the second plate 164 toward the rear surface of the housing 120.

Meanwhile, the first position determining part 166 may include a first wall body 166a extended from the second plate 164 in the height direction and a second wall body 166b extended from the first wall body 166a to press the extension part 142.

In addition, the first wall body 166a may be extended from the second plate 164 so as to be perpendicular to the second plate 164.

Meanwhile, since the second wall body 166b is disposed to press the extension part 142, a position of the shield can 160 in the height direction may be determined. That is, the position of the shield can 160 in the height direction may be determined by the second wall body 166b.

The second position determining part 168 may be extended from the other side of the second plate 164 and be bent twice so as to contact one side surface of the housing 120 while simultaneously pressing the extension part 142.

That is, the second position determining part 168 may be extended from the second plate 164 toward the front surface of the housing 120.

In addition, the second position determining part 168 may include a first wall body 168a extended from the second plate 164 downwardly in the height direction, a second wall body 168b extended from the first wall body 168a to press the extension part 142, and a third wall body 168c formed to be extended from the second wall body 168b downwardly in the height direction.

That is, the second position determining part 168 may have a shape in which it is bent twice such that the third wall body 168c thereof contacts the front surface of the housing 120 while the second wall body 168b thereof may press the extension part 142.

In addition, the second wall body 168b may determine, together with the second wall body 166b of the first position determining part 166, the position of the shield can 160 in the height direction. That is, the position of the shield can 160 in the height direction may be determined by the second wall bodies 166b and 168b of the first and second position determining parts 166 and 168.

Meanwhile, as described above, since the third wall body 168c is not formed at the first position determining part 166, the position of the extension part 142 is adjusted in a state in which the extension part 142 is temporarily adhered to the lamp arrangement part 124, whereby the lamp 150 may be accurately disposed below the second through-hole 164a.

The first sidewall 170 may be extended from one end of the first plate 162 downwardly in the height direction. That is, the first sidewall 170 may be extended from the first plate 162 toward one side surface of the housing 120.

In addition, the first sidewall 170 may be provided with a first insertion hole 170a into which the first coupling protrusion (not shown) is inserted. That is, the first coupling protrusion (not shown) may be inserted into the first insertion hole 170a, and an inner surface of the first sidewall 170 may contact one side surface of the housing 120.

As described above, the inner surface of the first sidewall 170 contacts one side surface of the housing 120 and the first coupling protrusion (not shown) is inserted into the first insertion hole 170a, whereby the position of the shield can 160 in the length direction may be determined.

The second sidewall 172 may be extended from one end of the second plate 164 downwardly in the height direction.

That is, the second sidewall 172 may be extended from the second plate 164 toward the other side surface of the housing 120.

In addition, the second sidewall 172 may be provided with a second insertion hole 172a into which the above-mentioned second coupling protrusion 124a is inserted. That is, the second coupling protrusion 124a may be inserted into the second insertion hole 172a, and an inner surface of the second sidewall 172 may contact the other side surface of the housing 120.

As described above, the inner surface of the second sidewall 172 contacts the other side surface of the housing 120 and the second coupling protrusion 124a is inserted into the second insertion hole 172a, whereby the position of the shield can 160 in the length direction may be determined.

The extension wall bodies 174 may be extended from the first plate 162 and contact the front surface and the rear surface of the housing 120 to face each other.

That is, inner surfaces of the extension wall bodies 174 may contact the front surface and the rear surface of the housing 120. Therefore, the position of the shield can 160 in the width direction of the housing 120 may be determined.

As described above, the shield can 160 may be accurately arranged in the length direction of the housing 120 by the first and second sidewalls 170 and 172 and be accurately arranged in the height and width directions of the housing 120 by the first and second position determining parts 166 and 168.

That is, the shield can 160 includes the first and second sidewalls 170 and 172 and the first and second position determining parts 166 and 168, whereby the lens part 110 and the lamp 150 may be exposed to the outside through the first and second through-holes 162a and 164a, without interference with the shield can 160.

In other words, the centers of the lens part 110 and the lamp 150 may accurately coincide with the centers of the first and second through-holes 162a and 164a through the first and second sidewalls 170 and 172 and the first and second position determining parts 166 and 168.

In addition, the first through-hole 162a may have the diameter larger than that of the lens part 110. Therefore, since the diameter of the first through-hole 162a is larger than that of the lens part 110, a difference in distances between the first and second through-holes 162a and 164a due to processing tolerances of the first and second through-holes 162a and 164a may be compensated.

That is, the center of the first through-hole 162a coincides with the center of the lens part 110, whereby the second through-hole 164a may be disposed directly above the lamp 150. Therefore, shielding of a portion of the lamp 150 may be prevented by the second plate 164.

Hereinafter, a method of assembling a camera module according to an embodiment of the present invention will be described with reference to the accompanying drawings.

Figure 5:
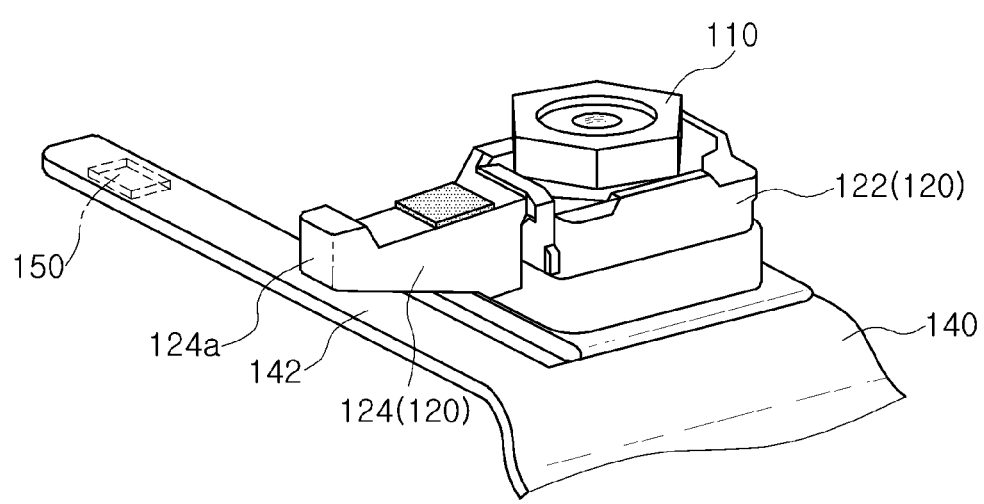
FIGS. 5 through 7 are views describing a method of assembling a camera module according to an embodiment of the present invention.
Figure 6:
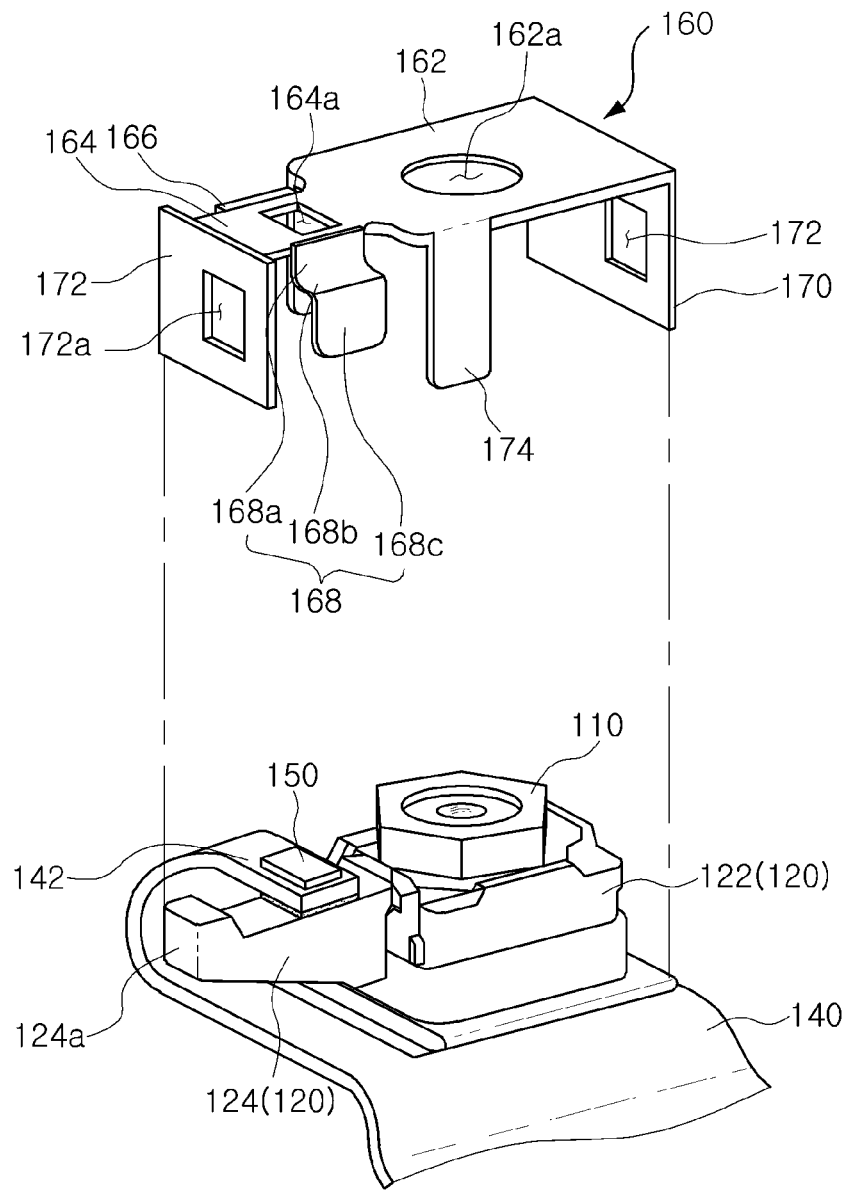
Figure 7:
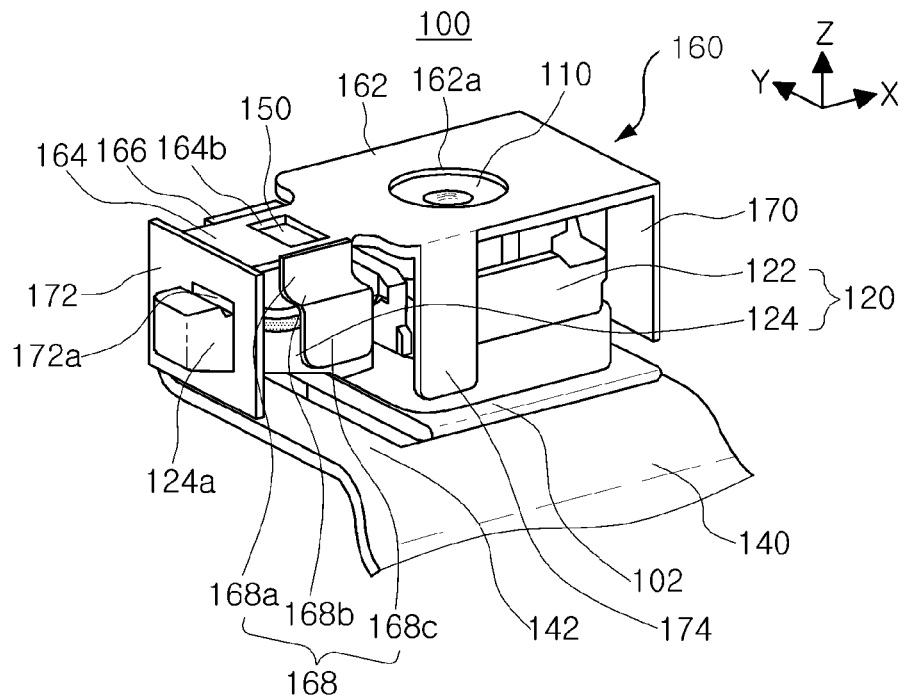

FIGS. 5 through 7 are views describing a method of assembling a camera module according to an embodiment of the present invention.

Referring to FIGS. 1 through 7, the housing 120 in which the lens part 110 is installed may be first installed on an upper surface of the flexible circuit board 140. Then, an adhesive is applied to an upper surface of the lamp arrangement part 124 of the housing 120.

After the applying of the adhesive, the extension part 142 may be bent by an operator, such that the upper surface of the extension part 142 may be temporarily adhered to the upper surface of the lamp arrangement part 124. In this case, the lamp 150 installed on the lower surface of the extension part 142 may be disposed in the upward direction.

Next, the shield can 160 is installed on the housing 120 by the operator. In this case, the first coupling protrusion (not shown) and the second coupling protrusion 124a of the housing 120 are inserted into the first insertion hole 170a and the second insertion hole 172a formed in the first sidewall 170 and the second sidewall 172 of the shield can 160, respectively. In addition, the inner surfaces of the first and second sidewalls 170 and 172 may contact both side surfaces of the housing 120.

As described above, the position of the shield can 160 may be determined in the length direction of the housing 120 through the first and second sidewalls 170 and 172. That is, the shield can 160 may be disposed in a predetermined position in the length direction of the housing 120 through the first and second sidewalls 170 and 172.

Meanwhile, in the case of combining the shield can 160 with the housing 120, the second wall bodies 166b and 168b of the first and second position determining parts 166 and 168 may press the extension part 142. In this case, when the lamp 150 does not accurately coincide with the second through-hole 164a of the second plate 164 in the position thereof, the operator adjusts the temporarily adhered extension part 142 to allow the centers of the lamp 150 and the second through-hole 164a of the second plate 164 to accurately coincide with each other.

In addition, as described above, the second wall bodies 166b and 168b of the first and second position determining parts 166 and 168 are disposed to press the extension part 142, whereby the position of the shield can 160 may be determined in the height direction of the housing 120. That is, the shield can 160 may be disposed in a predetermined position in the height direction of the housing 120 through the first and second wall bodies 166b and 168b.

Further, since the third wall body 168c of the second position determining part 168 contacts the front surface of the housing 120 and the extension wall bodies 174 contact the front surface and the rear surface of the housing 120, the position of the shield can 120 in the width direction of the housing 120 may be determined. That is, the shield can 160 may be disposed in a predetermined position in the width direction of the housing 120 through the third wall body 168c and the extension wall body 174.

As described above, since the shield can 160 includes the first and second sidewalls 170 and 172, the first and second position determining parts 166 and 168, and the extension wall bodies 174, the shield can 160 may be combined with the housing 120 such that the centers of the lens part 110 and the lamp 150 accurately coincide with the centers of the first and second through-holes 162a and 164a.

Then, the applied adhesive is hardened to allow the extension part 142 to be fixedly installed on the lamp arrangement part 124 of the housing 120.

Hereinafter, a camera module according to another embodiment of the present invention will be described with reference to the accompanying drawings. However, the same components as the above-mentioned components will be denoted by the same reference numerals and a detailed description thereof will be omitted.

Figure 8:
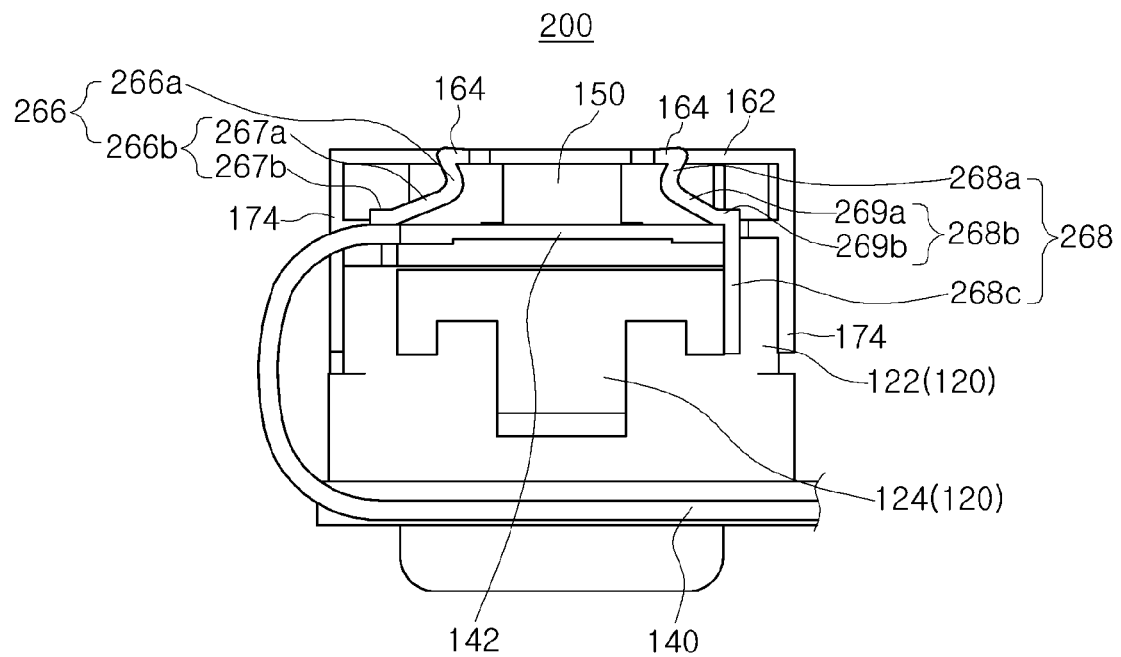
FIG. 8 is a side view of a camera module according to another embodiment of the present invention showing a portion corresponding to the camera module according to the embodiment of the present invention illustrated in FIG. 3.

FIG. 8 is a side view of a camera module according to another embodiment of the present invention showing a portion corresponding to the camera module according to the embodiment of the present invention illustrated in FIG. 3.

Referring to FIG. 8, in a camera module 200 according to another embodiment of the present invention, only first wall bodies 266a and 268a and second wall bodies 266b and 268b of first and second position determining parts 266 and 268 are different from the first and second wall bodies 166b and 168b of the first and second position determining parts 166 and 168 included in the camera module 100 according to the embodiment of the present invention described above, and other components are the same as components included in the camera module 100 according to the embodiment of the present invention described above. Therefore, hereinafter, only the first wall bodies 266a and 268a and the second wall bodies 266b and 268b will be described.

The first wall bodies 266a and 268a may be extended from the second plate 164 such that an angle formed between the first wall bodies 266 and the 268a and the second plate 164 is an acute angle or an obtuse angle, and the second wall bodies 266b and 268b may include inclined parts 267a and 269a bent from the first wall bodies 266a and 268a to thereby be inclined and pressing parts 267b and 269b extended from the inclined parts 267a and 269a and pressing the extension part 242, respectively.

Meanwhile, the second wall bodies 266b and 268b may be more easily elastically deformed through the inclined parts 267a and 269a while decreasing a contact area with the extension part 142 through the pressing parts 267b and 269b, respectively.

As a result, the first and second position determining parts 266 and 268 may more firmly fix the extension part 142 thereto.

Hereinafter, a camera module according to another embodiment of the present invention will be described with reference to the accompanying drawings.

Figure 9:
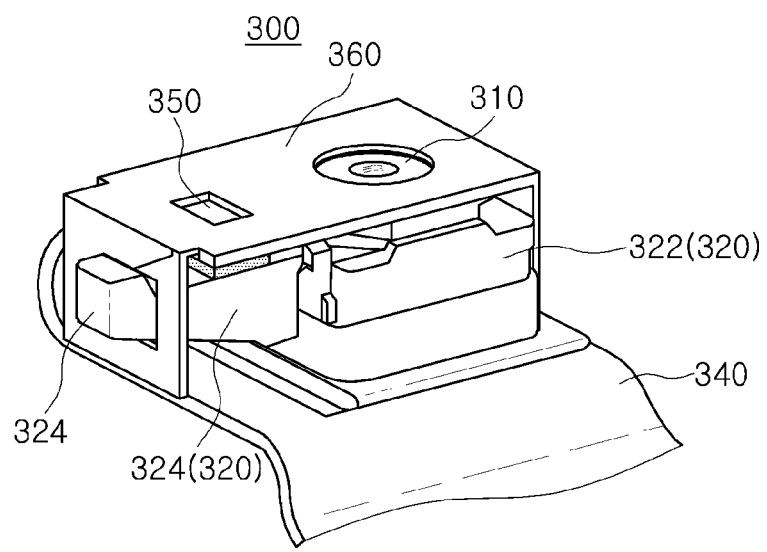
FIG. 9 is a schematic perspective view showing a camera module according to another embodiment of the present invention.
Figure 10:
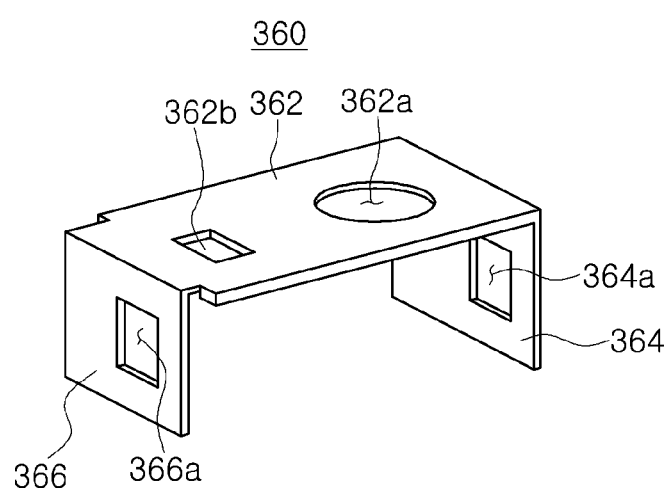
FIG. 10 is a schematic perspective view showing a shield can included in the camera module according to another embodiment of the present invention.

FIG. 9 is a schematic perspective view showing a camera module according to another embodiment of the present invention; and FIG. 10 is a schematic perspective view showing a shield can included in the camera module according to another embodiment of the present invention.

Referring to FIGS. 9 and 10, a camera module 300 according to another embodiment of the present invention may include a housing 320, a flexible circuit board 340, and a shield can 360 by way of example.

Meanwhile, since the housing 320 and the flexible circuit board 340 included in the camera module 300 according another embodiment of the present invention are the same as the housing 120 and the flexible circuit board 140 included in the camera module 100 according to the embodiment of the present invention described above, a detailed description thereof will be replaced by the above-mentioned description and be omitted.

The shield can 360 may have first and second through-holes 362a and 362b formed therein such that a lens part 310 and a lamp 350 may be exposed therethrough. Meanwhile, the shield can 360 may serve to shield electromagnetic waves and be formed of a metal material.

In addition, the shield can 360 may include a plate 362, a first sidewall 364, and a second sidewall 366.

The plate 362 may have the first through-hole 362a formed therein to expose the lens part 310 and the second through-hole 362b disposed to be spaced apart from the first through-hole 362a and formed therein to expose the lamp 350.

Meanwhile, the first sidewall 364 may be extended from one end of the plate 362 downwardly in the height direction.

In addition, the first sidewall 364 may be provided with a first insertion hole 364a into which a first coupling protrusion (not shown) formed on the housing 320 is inserted. That is, the first coupling protrusion (not shown) is inserted into the first insertion hole 364a, and an inner surface of the first sidewall 364 contacts one side surface of the housing 320, whereby a position of the shield can 360 in the length direction may be determined.

In addition, the second sidewall 366 may be extended from one end of the plate 362 downwardly in the height direction. Further, the second sidewall 366 may be provided with a second insertion hole 366a into which a second coupling protrusion 324a formed on the housing 320 is inserted. That is, the second coupling protrusion 324a is inserted into the second insertion hole 366a, and an inner surface of the second sidewall 366 contacts the other side surface of the housing 320, whereby the position of the shield can 360 in the length direction may be determined.

As described above, the shield can 360 is combined with the housing 320, whereby the electromagnetic waves may be shielded. Further, the lens part 310 and the lamp 350 may be positioned below the first and second through-holes 362a and 362b through the first and second sidewalls 364 and 366, respectively.

As set forth above, according to the embodiment of the present invention, the shield can may be accurately arranged in the length direction of the housing through the first and second sidewalls and be accurately arranged in the height and width directions of the housing through the first and second position determining parts.

That is, the shield can includes the first and second sidewalls and the first and second position determining parts, whereby the lens part and the lamp may be exposed to the outside through the first and second through-holes without interference with the shield can.

While the present invention has been shown and described in connection with the embodiments, it will be apparent to those skilled in the art that modifications and variations can be made without departing from the spirit and scope of the invention as defined by the appended claims.

What is claimed is:

1. A camera module, comprising:
   a housing comprising a lens part installed therein;
   a flexible circuit board comprising an extension part coupled to the housing, wherein a lamp is installed on the extension part and is disposed to be adjacent to the lens part; and
   a shield can comprising
      first and second through-holes formed therein exposing the lens part and the lamp therethrough,
      a first plate comprising the first through-hole formed therein to expose the lens part,
      a second plate extended from the first plate and having the second through-hole formed therein, and
      a first position determining part extended from one side of the second plate and bent to press the extension part.

2. The camera module of claim 1, wherein the shield can further comprises a second position determining part extended from the other side of the second plate facing the first position determining part and bent twice to contact one side surface of the housing while simultaneously pressing the extension part.

3. The camera module of claim 1, wherein the shield can further comprises a first sidewall extended from one end of the first plate downwardly in a height direction.

4. The camera module of claim 3, wherein the first sidewall comprises a first insertion hole into which a first coupling protrusion formed on the housing is inserted.

5. The camera module of claim 1, wherein the shield can further comprises a second sidewall extended from one end of the second plate downwardly in a height direction so as to face the first sidewall.

6. The camera module of claim 5, wherein the second sidewall comprises a second insertion hole into which a second coupling protrusion formed on the housing is inserted.

7. A camera module comprising: a housing comprising a lens part therein: a flexible circuit board comprising an extension part coupled to the housing, wherein a lamp is installed on the extension part and is disposed to be adjacent to the lens part, a shield can comprising first and second through-holes formed therein exposing the lens part and the lamp therethrough, a first plate comprising the first through-hole formed therein to expose the lens part, and a second plate extended from the first plate and having the second through-hole formed therein, and wherein the first plate is provided with extension wall bodies contacting a front surface and a rear surface of the housing and facing each other.

8. The camera module of claim 1, wherein
the shield can further comprises a first position determining part extended from one side of the second plate and bent to press the extension part, and a second position determining part extended from the other side of the second plate facing the first position determining part and bent twice to contact one side surface of the housing while simultaneously pressing the extension part,
the first and second position determining parts, respectively, comprise a first wall body provided in a height direction and a second wall body extended from the first wall body to press the extension part, and
the second position determining part further comprises a third wall body extended from the second wall body downwardly in a height direction.

9. The camera module of claim 8, wherein the first wall body extends to be perpendicular to the second plate.

10. The camera module of claim 8, wherein the first wall body is extended from the second plate forming an angle between the first wall body and the second plate is an acute angle or an obtuse angle, and the second wall body comprises an inclined part bent from the first wall body to be inclined and a pressing part extended from the inclined part and pressing the extension part.

11. The camera module of claim 1, wherein the first through-hole comprises a diameter larger than that of the lens part.

12. The camera module of claim 1, wherein the shield can comprises:
a plate comprising the first through-hole formed therein to expose the lens part and the second through-hole formed therein to expose the lamp;
a first sidewall extended from one end of the plate downwardly in a height direction; and
a second sidewall extended from the other end of the plate downwardly in the height direction.

13. The camera module of claim 12, wherein the first sidewall comprises a first insertion hole into which a first coupling protrusion formed on the housing is inserted.

14. The camera module of claim 12, wherein the second sidewall comprises a second insertion hole into which a second coupling protrusion formed on the housing is inserted.

15. A camera module, comprising:
a housing comprising a lens part installed therein;
a flexible circuit board comprising an extension part coupled to the housing, wherein a lamp is installed on the extension part and is disposed to be adjacent to the lens part; and
a shield can comprising
first and second through-holes formed therein exposing the lens part and the lamp therethrough,
a first plate having the first through-hole formed therein to expose the lens part;
a second plate comprising a width smaller than that of the first plate, extended from the first plate, and comprising the second through-hole formed therein;
a first position determining part extended from one side of the second plate and bent to press the extension part;
a second position determining part extended from the other side of the second plate facing the first position determining part and bent twice to contact one side surface of the housing while simultaneously pressing the extension part;
a first sidewall extended from one end of the first plate downwardly in a height direction; and
a second sidewall extended from one end of the second plate downwardly in the height direction so as to face the first sidewall.

16. The camera module of claim 15, wherein the first sidewall comprises a first insertion hole into which a first coupling protrusion formed on the housing is inserted, and the second sidewall comprises a second insertion hole into which a second coupling protrusion formed on the housing is inserted.

17. The camera module of claim 15, wherein the first and second position determining parts, respectively, comprise a first wall body provided in the height direction and a second wall body extended from the first wall body to press the extension part, and the second position determining part further comprises a third wall body extended from the second wall body downwardly in the height direction.

18. The camera module of claim 17, wherein the first wall body extends to be perpendicular to the second plate.

19. The camera module of claim 17, wherein the first wall body is extended from the second plate forming an angle between the first wall body and the second plate is an acute angle or an obtuse angle, and the second wall body comprises an inclined part bent from the first wall body be inclined and a pressing part extended from the inclined part and pressing the extension part.

20. The camera module of claim 15, wherein the first through-hole comprises a diameter larger than that of the lens part.

\* \* \* \* \*